(12) United States Patent
Rees

(10) Patent No.: US 10,602,724 B2
(45) Date of Patent: Mar. 31, 2020

(54) LIFT ASSEMBLY FOR PROCESSING EGGS, AND ASSOCIATED METHOD

(71) Applicant: Zoetis Services LLC, Parsippany, NJ (US)

(72) Inventor: Daniel Scott Rees, Zebulon, NC (US)

(73) Assignee: Zoetis Services LLC, Parsippany, NJ (US)

( * ) Notice: Subject to any disclaimer, the term of this patent is extended or adjusted under 35 U.S.C. 154(b) by 765 days.

(21) Appl. No.: 15/010,435

(22) Filed: Jan. 29, 2016

(65) Prior Publication Data

US 2016/0227744 A1   Aug. 11, 2016

Related U.S. Application Data

(60) Provisional application No. 62/113,646, filed on Feb. 9, 2015.

(51) Int. Cl.
| | | |
|---|---|---|
| *A01K 45/00* | (2006.01) | |
| *B66D 1/60* | (2006.01) | |
| *A01K 43/00* | (2006.01) | |

(52) U.S. Cl.
CPC .............. *A01K 45/00* (2013.01); *A01K 43/00* (2013.01); *A01K 45/007* (2013.01); *B66D 1/60* (2013.01)

(58) Field of Classification Search
CPC . B66D 1/26; B66D 1/60; A01K 45/00; A01K 45/007; A01K 43/00
See application file for complete search history.

(56) References Cited

U.S. PATENT DOCUMENTS

| | | | |
|---|---|---|---|
| 3,099,848 A | 8/1963 | Mountz | |
| 3,937,167 A | 2/1976 | Warren | |
| 4,037,565 A * | 7/1977 | Ledwell, Jr. | ......... A01K 45/005 |
| | | | 119/846 |
| 4,765,487 A * | 8/1988 | Bliss | ...................... B65G 57/24 |
| | | | 209/510 |
| 5,056,464 A | 10/1991 | Lewis | |
| 2014/0080615 A1* | 3/2014 | Sowka | .................... A63J 1/028 |
| | | | 472/78 |

FOREIGN PATENT DOCUMENTS

| | | | | |
|---|---|---|---|---|
| FR | 668062 A * | 10/1929 | ............... | B66D 1/26 |
| KR | 10-2009-0072540 | 7/2009 | | |
| WO | WO 2015/095121 A1 | 6/2015 | | |

OTHER PUBLICATIONS

PCT International Search Report and Written Opinion, International Filing Date Feb. 4, 2016; International Application No. PCT/US2016/016484.

(Continued)

*Primary Examiner* — Sang K Kim
*Assistant Examiner* — Nathaniel L Adams
(74) *Attorney, Agent, or Firm* — Scott C. Mayhew

(57) ABSTRACT

An egg processing apparatus is provided. Such an apparatus includes a frame and a lift assembly operably engaged with the frame. The lift assembly has a pulley system. An egg processing head is operably engaged with the pulley system. A plurality of egg processing devices is operably engaged with the egg processing head. The pulley system is configured to move the egg processing head such that the egg processing devices are capable of interacting with eggs provided proximate thereto. An associated method is also provided.

5 Claims, 4 Drawing Sheets

(56) References Cited

OTHER PUBLICATIONS

Notice of Last Preliminary Rejection (Non-Final) from the Korean Intellectual Property Office (KIPO), Korean Patent Application No. 10-2017-7021887, Non-English.
Notice of Last Preliminary Rejection (Non-Final) from the Korean Intellectual Property Office (KIPO), Korean Patent Application No. 10-2017-7021887, English Translation.

* cited by examiner

LIFT ASSEMBLY FOR PROCESSING EGGS, AND ASSOCIATED METHOD

CROSS REFERENCE TO RELATED APPLICATION

This application claims the benefit of U.S. Provisional Patent Application No. 62/113,646, filed Feb. 9, 2015, which is expressly incorporated herein by reference in its entirety.

TECHNICAL FIELD

The present disclosure generally relates to egg processing devices and systems. More particularly, the present disclosure relates to a lift assembly for an egg processing system capable of interacting with eggs contained within a flat or container, and an associated method.

BACKGROUND

Various mechanical egg processing systems are used to process avian eggs within a poultry hatchery facility. Such mechanical egg processing systems may include, for example, a transfer system for transferring eggs from a tray associated with a setter incubator (commonly referred to as a "flat") to a container associated with a hatcher incubator (commonly referred to as a "hatching basket"). In other instances, an example of such mechanical egg processing systems may include an egg removal system for removing certain eggs from the flats. In some instances, such mechanical egg processing systems may combine features from the transfer system and the egg removal system. Still another example of such mechanical egg processing systems may include an in ovo injection system for injecting a treatment substance, such as a vaccine, into the eggs. Finally, another example of such mechanical egg processing systems may include a sampling system for removing a sample material from the eggs for analysis.

Typically, the eggs enter any one of these mechanical egg processing systems in the flats, which are transported beneath a head having a plurality of processing devices attached thereto. The processing devices engage the eggs for processing when the head is lowered proximate to the eggs. The head usually descends or ascends using pneumatically operated lift systems. Unfortunately, these types of lifting systems may not provide optimal performance. For example, the pneumatic systems may cause binding or otherwise cause the head to not be level as it descends. Moreover, these types of lifting systems do not allow for accurately controlled motion of the head, wherein speed of motion cannot be controlled to achieve optimal performance. Additionally, the pneumatic lift cylinder of the system requires large amounts of high pressure air when scaled up to a large head size, which is compounded when several modules require head movement at the same time, which may often be the case with the egg processing equipment mentioned above. Finally, pneumatic cylinders do not give multiple stop positions without adding increased cost.

Accordingly, it would be desirable to provide an egg processing apparatus having a lift system capable of improving control and motion of a head having a plurality of egg processing devices. Furthermore, it would be desirable to provide an associated method that would facilitate improved control and motion of a head of an egg processing apparatus.

BRIEF SUMMARY

The above and other needs are met by aspects of the present disclosure which, according to one aspect, provides an egg processing apparatus having a frame and a lift assembly operably engaged with the frame. The lift assembly has a pulley system. An egg processing head is operably engaged with the pulley system. A plurality of egg processing devices is operably engaged with the egg processing bead. The pulley system is configured to move the egg processing head such that the egg processing devices are capable of interacting with eggs provided proximate thereto.

Another aspect provides a method of processing eggs. The method comprises providing a plurality of eggs to an egg processing apparatus for processing thereof the egg processing apparatus comprising an egg, processing head having a plurality of egg processing devices operably engaged therewith. The method further comprises lowering the egg processing head via a lift assembly having a pulley system such that the egg processing devices are capable of interacting with the eggs. The method further comprises processing the eggs, and raising the egg processing head via the pulley system such that subsequent eggs are capable of being positioned proximate to the egg processing head for processing thereof.

Thus, various aspects of the present disclosure provide advantages, as otherwise detailed herein.

BRIEF DESCRIPTION OF THE DRAWINGS

Figure 1:
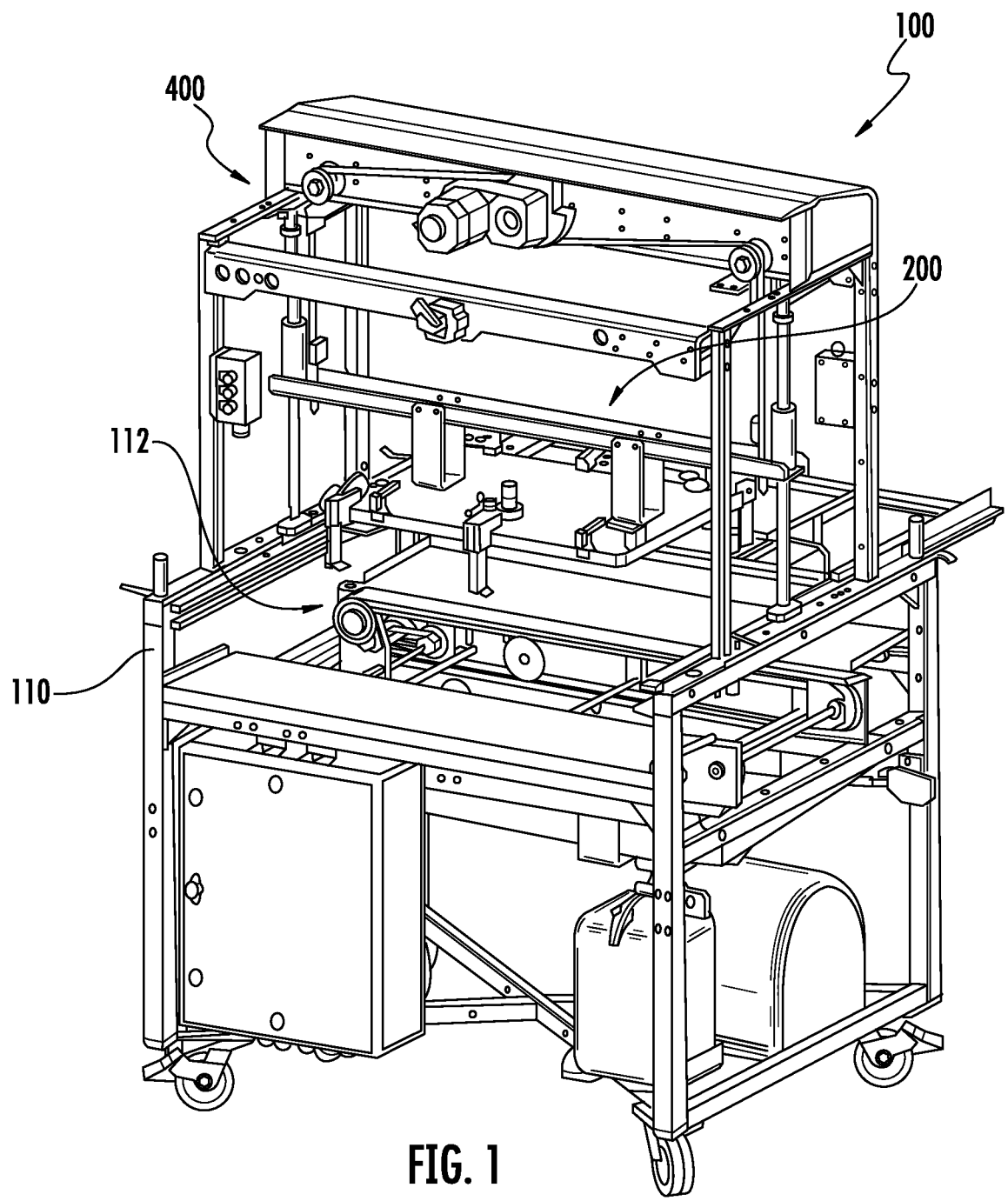
Figure 2:
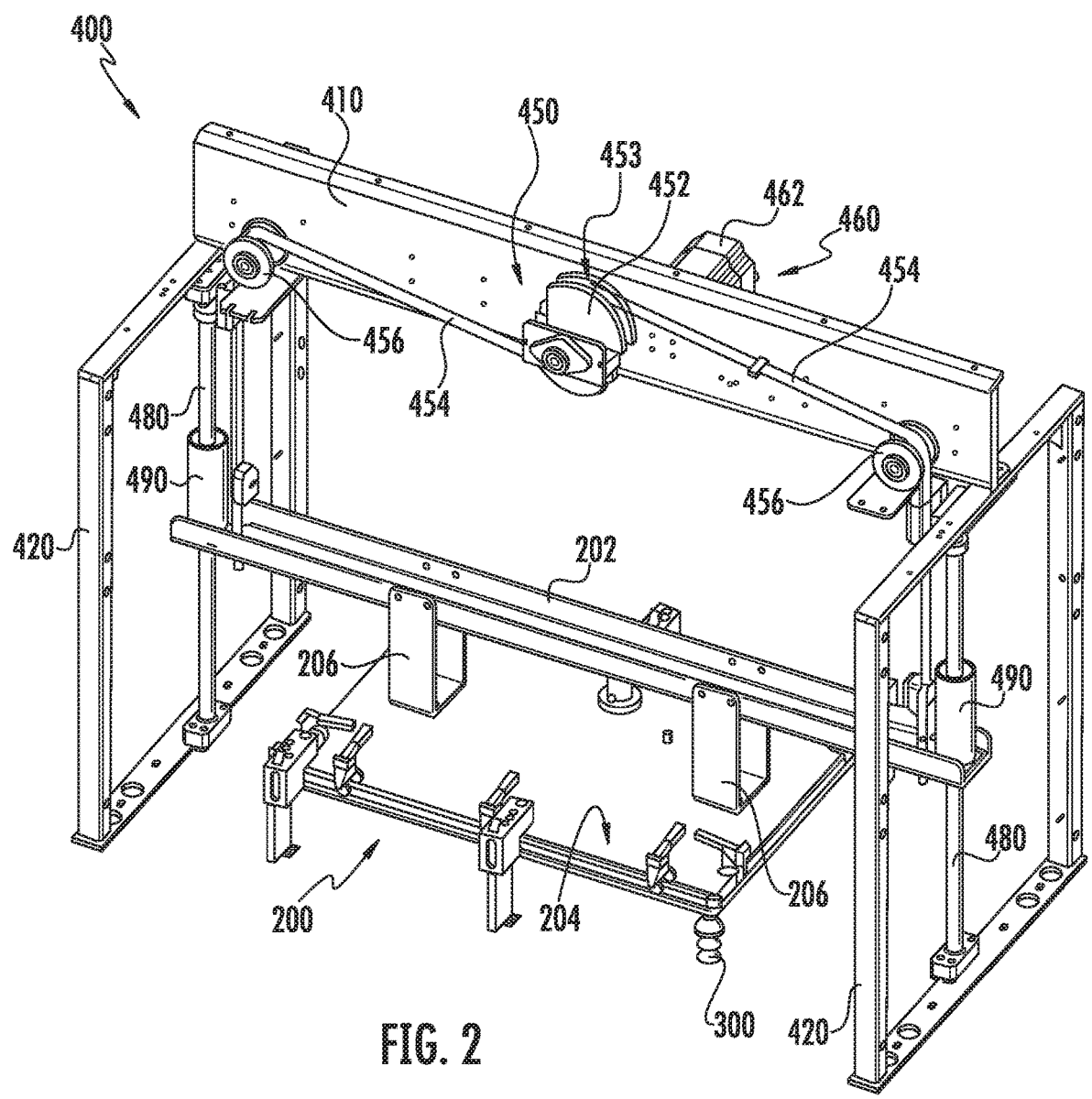
Figure 3:
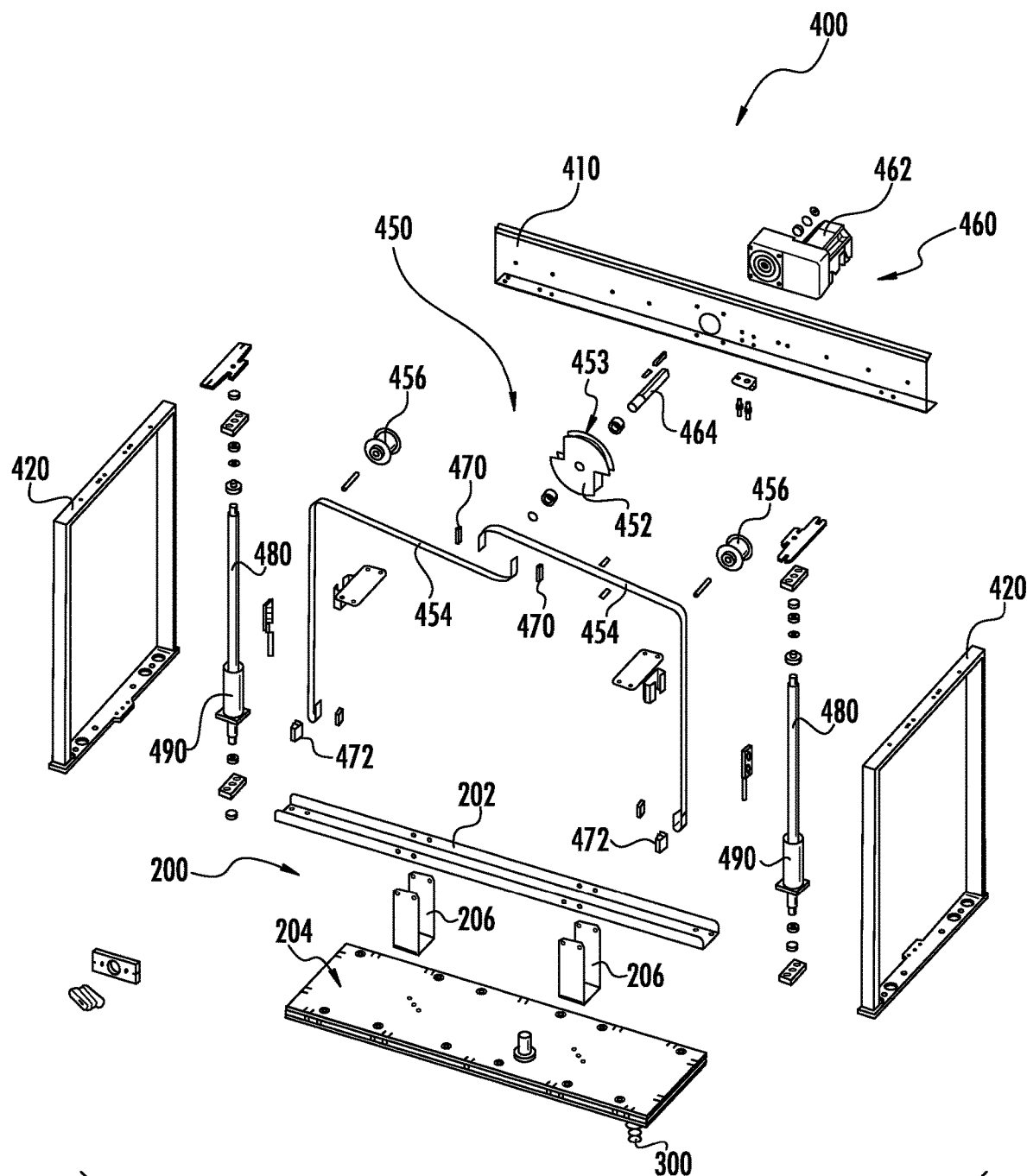
Figure 6:
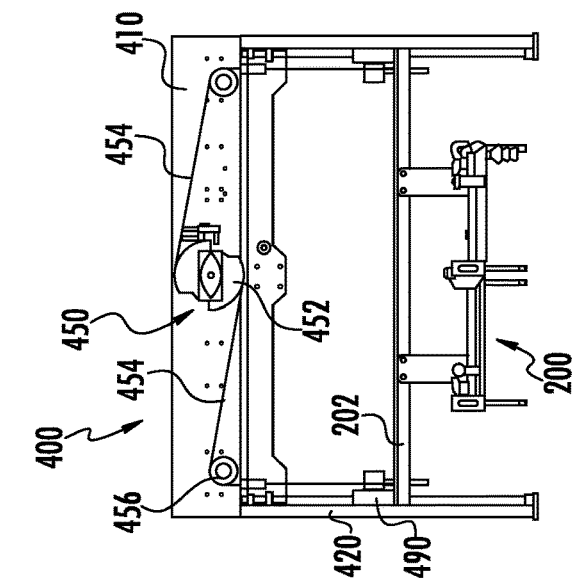
Figure 5:
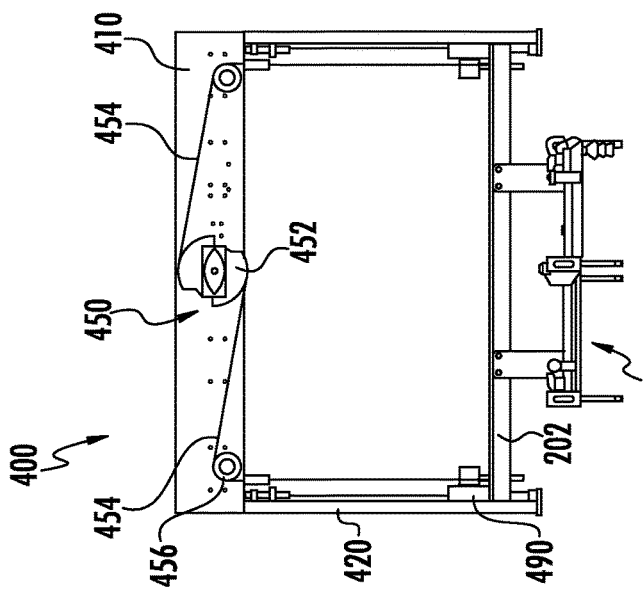
Figure 4:
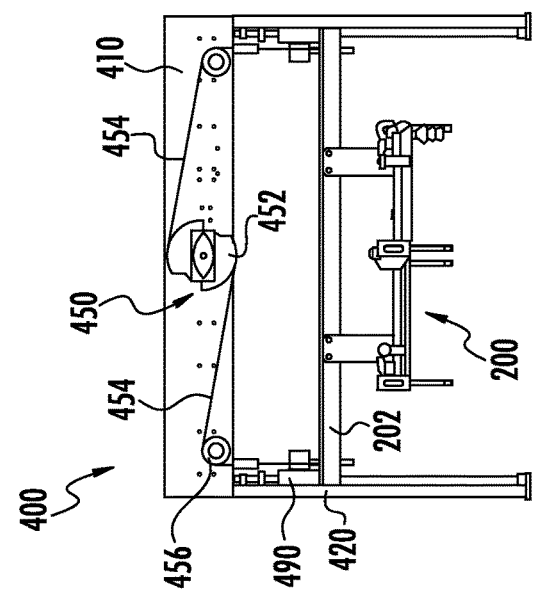

Having thus described various embodiments of the present disclosure in general terms, reference will now be made to the accompanying drawings, which are not necessarily drawn to scale, and wherein:

FIG. 1 is an isometric view of an egg processing apparatus having a lift assembly, according to one aspect of the present disclosure;

FIG. 2 is an isometric view of a lift assembly and egg processing head capable of being implemented on an egg, processing apparatus, according to one aspect of the present disclosure;

FIG. 3 is an exploded view of the lift assembly and egg processing head of FIG. 2; and FIGS. 4-6 are front schematic views of a lift assembly and egg processing head, illustrating, the egg processing head at various vertical positions, according to aspects of the present disclosure.

DETAILED DESCRIPTION OF THE DISCLOSURE

Various aspects of the present disclosure now will be described more fully hereinafter with reference to the accompanying drawings, in which some but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

FIG. 1 illustrates an egg processing apparatus 100. According to this particular aspect shown, the egg processing apparatus 100 is capable of removing eggs identified as having a certain classification. Aspects of the present disclosure, however, are not limited to the illustrated egg processing apparatus 100, which is shown as an egg remover apparatus. In some instances, the egg processing apparatus 100 may be capable of injecting and or transferring the eggs. Further, in still other instances, the egg processing apparatus 100 may be an egg transfer apparatus used to transfer eggs from a setter incubator tray (a so-called "flat") to a hatch incubator tray (a so-called "hatching basket"). Still, in other instances, the egg processing apparatus 100 may be capable of extracting a sample from eggs.

As shown in FIG. 1, the egg processing apparatus 100 may be particularly adapted for processing eggs positioned below an egg processing head 200. In some instances, the egg processing apparatus 100 may include multiple egg processing heads 200. According to some aspects, the egg processing apparatus 100 may include a frame 110 and a conveyor assembly 112 provided to move the flats in an automated manner through the egg processing apparatus 100 to a processing position. The conveyor assembly 112 may be configured to receive and guide the flats to the processing position. The conveyor assembly 112 may further include appropriate stop elements, sensors, belts, endless loops, motors, etc. for proper indexing and positioning of the flats within the egg processing apparatus 100. In some instances, the flats may be manually advanced through the egg processing apparatus 100.

According, to aspect, the egg processing head 200 may include a head crossbeam 202 and a head plate assembly 204. A pair of head brackets 206 may connect the head crossbeam 202 to the head plate assembly 204.

The egg processing head 200 may have attached thereto a plurality of egg processing devices capable of interacting, engaging, or otherwise contacting the eggs at the processing position. As particularly shown in FIGS. 2 and 3, the egg processing device may be an egg remover device 300 (e.g., a suction cup device) capable of removing eggs from the flat using, for example, suction or vacuum. The egg processing devices may include the egg remover device 300, an injection device, an egg transfer device, a sampling device, a combination injection and transfer device, or any other devices or tools used to process eggs.

As shown in FIG. 1, the egg processing head 200 may be coupled to the frame 110 and configured to move vertically for interacting with eggs positioned at the processing position beneath the egg processing head 200. According to aspects of the present disclosure, as shown in FIGS. 1-6, the egg processing, apparatus 100 may include a lift assembly 400 for facilitating controlled movement of the egg processing head 200. The lift assembly 400 may control vertical motion of the egg processing head 200 in both vertical directions (up and down) such that the lift assembly may controllably descend and ascend at a level of optimal precision and accuracy.

The lift assembly 400 may include a pulley system 450 configured to move the egg processing head 200 vertically such that the egg processing devices are capable of interacting with eggs provided at the processing position. In some instances, the pulley system 450 may be a motorized pulley system 450. In this regard, a drive assembly 460 may include a lift motor 462 centered directly above or below the egg processing, head 200 with a drive pulley 452 attached to a drive shaft 464 of the drive assembly 460. A plurality of elongate drive members 454 may be attached to the drive pulley 452 with fasteners 470 and supported over idler pulleys 456 and then attached to opposite ends of the egg processing head 200 using appropriate fasteners 472.

According to one aspect, a pair of elongate drive members 454 may be attached to the head crossbeam 202. The elongate drive members 454 may be, for example, belts, cables, chain, rope or other suitable pulley implementing means. The drive assembly 460, drive pulley 452, and idler pulleys 456 may be mounted to a lift crossbeam 410. The drive pulley 452 may define a channel or groove 453 through which the elongate drive members 454 are received and attached such that the elongate drive members 454 maintain engagement therewith throughout movement of the egg processing head 280.

As shown, the elongate drive members 454 may be attached 180° apart such that, when the drive assembly 460 rotates the drive pulley 452, the elongate drive members 454 wind up equally on the drive pulley 452, which in turn lifts the egg processing head 200. When the lift motor 462 direction is reversed, the elongate drive members 454 unwind, thereby lowering the egg processing head 200 in a vertical downward direction.

In some instances, a single elongate drive member 454 may be used in which the drive pulley 452 includes a slot through which the elongate drive member 454 extends. In such instances, one end of the elongate drive member 454 attaches to one end of the egg processing head 200 (e.g., head crossbeam 202) and is drawn across the two idler pulleys 456 and through the slot of the drive pulley 452, while the other end of the elongate drive member 454 attaches to the other end of the egg, processing head 200 (e.g., head crossbeam 202). In this manner, the use of multiple elongate drive members 454 may be eliminated. Rotation of the drive pulley 452 via the drive assembly 460 would still cause the elongate drive member 454 to wind and unwind on the drive pulley 452 for achieving vertical movement of the egg processing head 200.

Guide shafts 480 may guide the motion of the egg processing head 200 at both ends thereof with bearing members 490, such as bushings, mounted to the egg processing head 200 for smooth motion. Each guide shaft 480 may be coupled to a lift support frame 420.

A controller may be used to actuate the lift motor 462 and control movement of the pulley system 450. The controller may be configured with appropriate software to start/stop the lift motor 462 and change the direction so as to facilitate positioning of the egg processing head 200 at any head position within the limits of the guide shafts 480. In some instances, the controller may be configured with appropriate software to control the speed and acceleration/deceleration of the egg processing head 200 (via the lift assembly 400) to achieve desired cycle time and smooth slowing motion to stop positions. Positions of the egg processing head 200 may also be changed quickly and may be used for various types of egg processing heads.

According to some aspects, the lift assembly 400 may be capable of lifting between about 50 lbs (~22 kg) and about 400 lbs (~181 kg) during stroke. The lift assembly 400 may provide multiple positions for the egg processing head 200 depending on egg size and the egg processing module on which it is mounted. The stroke of the egg processing head 200 may range from about 2 inches (50.8 mm) to about 14 inches (355.6 mm), depending on the type of egg processing device mounted to the egg processing head 200. For example, the stroke of the egg processing head 200 may be about 2 inches (50.8 mm) when configured as an injection head (with injection devices) for injecting eggs with a treatment substance, about 9 inches (228.6 mm) when configured as an egg remover head (with egg remover devices) for removing eggs from a flat, and about 14 inches (355.6 mm) when configured as transfer head (with transfer devices) for transferring eggs from a flat to a hatching basket.

The lift assembly 400 may include sensors to detect a home position and an over-travel position of the egg processing head 200. A motor encoder may track the operating positions of the egg processing head 200 with respect to a head up position (FIG. 4), a head down position (FIG. 5), and an intermediate head position (FIG. 6).

FIGS. 4-6 illustrate a sequence of operations for an exemplary egg processing apparatus 100 having a lift assembly 400 in accordance with the present disclosure. In the exemplary egg processing apparatus 100, the egg processing head 200 may begin at a head up position (home position), as shown in FIG. 4, such that a plurality of eggs transported in a flat may be positioned below the egg processing head 200. Once the flat is positioned, the drive assembly 460 may rotate accordingly (the axis of rotation pointing into the page in FIG. 4) such that the elongate drive members 454 unwind on the drive pulley 452, thereby controllably lowering the egg processing head 200 to a head down position (down position), as shown in FIG. 5, such that the egg processing devices carried by the egg processing head 200 may interact with the eggs. When the lift motor 462 direction is reversed (the axis of rotation pointing out of the page in FIG. 6), the drive assembly 460 rotates the drive pulley 452 via the drive shaft 464 such that the elongate drive members 454 wind up equally on the drive pulley 452, which in turn lifts the egg processing head 200, as shown in FIG. 6 at an intermediate position between the home position and the down position.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An egg processing apparatus, comprising:
  a frame;
  a lift assembly operably engaged with the frame and having a motorized pulley system comprising an elongate drive member, a plurality of idler pulleys, and a drive pulley, the pulley system further comprising a drive assembly having a lift motor and a drive shaft, the drive pulley being attached to the drive shaft to facilitate rotation thereof; and
  an egg processing head having a plurality of egg processing devices, a head plate assembly, and a head crossbeam, each idler pulley being disposed along the elongate drive member between the drive pulley and the head crossbeam, the lift motor being centered above the egg processing head, the elongate drive member being operably engaged with the head crossbeam at opposite ends thereof such that rotation of the drive pulley causes the elongate drive member to wind upon or unwind from the drive pulley, thereby facilitating vertical motion of the egg processing head.

2. An egg processing apparatus according to claim 1, wherein the pulley system comprises a plurality of elongate drive members, each attached at one end to the drive pulley and at the other end to the head crossbeam.

3. An egg processing apparatus according to claim 2, wherein the lift assembly further comprises a plurality of guide shafts operably engaged with the frame, and the lift assembly further comprises a plurality of bearing members operably engaged with the head crossbeam, each bearing member being configured to move vertically along a respective guide shaft as the egg processing head is moved vertically by the pulley system.

4. A method of processing eggs, the method comprising:
  providing a plurality of eggs to an egg processing apparatus for processing thereof, the egg processing apparatus comprising an egg processing head having a plurality of egg processing devices, a head plate assembly, and a head crossbeam;
  lowering the egg processing head via a lift assembly having a motorized pulley system comprising an elongate drive member, a plurality of idler pulleys, and a drive pulley, each idler pulley being disposed along the elongate drive member between the drive pulley and the head crossbeam, the pulley system further comprising a drive assembly having a lift motor and a drive shaft, the drive pulley being attached to the drive shaft to facilitate rotation thereof, the elongate drive member being operably engaged with the head crossbeam at opposite ends thereof such that rotation of the drive pulley in a first direction causes the elongate drive member to unwind from the drive pulley, thereby lowering the egg processing head;
  processing the eggs with the egg processing devices; and
  rotating the drive pulley in a direction opposite the first direction to wind the elongate drive member about the drive pulley, thereby raising the egg processing head.

5. A method according to claim 4, further comprising the step of guiding the egg processing head vertically using a plurality of guide shafts and corresponding bearing members operably engaged with the head crossbeam.

* * * * *